(12) United States Patent
Ku et al.

(10) Patent No.: US 7,267,566 B2
(45) Date of Patent: Sep. 11, 2007

(54) HINGE ASSEMBLY

(75) Inventors: Hung-Chung Ku, Taipei (TW); Chih-Kai Hu, Taipei (TW); Pin-An Hsieh, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/434,230

(22) Filed: May 16, 2006

(65) Prior Publication Data
US 2006/0286836 A1 Dec. 21, 2006

(30) Foreign Application Priority Data
Jun. 15, 2005 (TW) .............................. 94119890 A

(51) Int. Cl.
*H01R 3/00* (2006.01)

(52) U.S. Cl. ...................................................... 439/165

(58) Field of Classification Search ................ 439/165, 439/31, 446, 191, 638, 219, 326, 636–637
See application file for complete search history.

(56) References Cited

U.S. PATENT DOCUMENTS

| | | | |
|---|---|---|---|
| 5,951,312 A * | 9/1999 | Horng | 439/165 |
| 6,447,315 B1 * | 9/2002 | Pan et al. | 439/165 |
| 2004/0002241 A1 * | 1/2004 | Lee | 439/165 |
| 2004/0074045 A1 * | 4/2004 | Winstead et al. | 16/2.1 |

* cited by examiner

*Primary Examiner*—J. F. Duverne
(74) *Attorney, Agent, or Firm*—Birch, Stewart, Kolasch & Birch, LLP

(57) ABSTRACT

A hinge assembly includes an inner ring and an outer ring. The outer ring has an outer ring slot penetrating the sidewall of the outer ring and connecting both ends of the outer ring. The inner ring has an inner ring slot penetrating the sidewall of the inner ring and connecting both ends of the inner ring. The inner ring is coaxially connected to the outer ring. When the inner ring slot and the outer ring slot are aligned, an electrical connecting device can pass through the inner ring slot and outer ring slot to stay in the hinge assembly.

5 Claims, 4 Drawing Sheets

HINGE ASSEMBLY

RELATED APPLICATIONS

The present application is based on, and claims priority from, Taiwan Application Serial Number 94119890, filed Jun. 15, 2005, the disclosure of which is hereby incorporated by reference herein in its entirety.

BACKGROUND

1. Field of Invention

The present invention relates to a connecting device. More particularly, the present invention relates to a hinge assembly.

2. Description of Related Art

Many electrical apparatuses have devices which can be moved or rotated relative to each other. For example, the display screen of a mobile phone with a clam structure can be rotated relative to the base of the mobile phone. Two traditional kinds of hinge assemblies are available for providing electrical connections that can be rotated.

The first kind is the hollow type hinge assembly. An electrical connecting device, such as a flexible printed circuit, passes through the hollow type hinge assembly to electrically connect two devices, which can be rotated relative to each other. This limits the size of connectors configured on both sides of the flexible printed circuit because the connectors need to pass through the hollow type hinge assembly. The size of the connector becomes more and more difficult to design as the size of modern electrical apparatuses becomes smaller and smaller.

The second kind is the winding type hinge assembly. A flexible printed circuit is wound around the hinge assembly between two devices, which the hinge assembly is mounted on, to electrically connect those two devices. However, the winding type hinge assembly is difficult to assemble, especially due to winding the flexible circuit to electrically connect devices. Moreover, the inevitable friction between the flexible printed circuit and the hinge assembly during the rotation operation easily wears the flexible printed circuit.

SUMMARY

An aspect of the present invention provides a hinge assembly to remove the size limitation of a connector, and prevent wear between the flexible printed circuit and the hinge assembly.

Another aspect of the present invention provides a hinge assembly for connecting two devices that can be rotated relative to each other. Connectors are configured on both sides of an electrical connecting device, such as a flexible printed circuit, for electrically connecting the two devices. In accordance with the embodiment of the present invention, a hinge assembly including an inner ring and an outer ring is provided. The outer ring has an outer ring slot penetrating the sidewall of the outer ring. The inner ring has an inner ring slot penetrating the sidewall of the inner ring. The inner ring is coaxially connected to the outer ring. When the inner ring slot and outer ring slot are aligned, an electrical connecting device can pass through the inner ring slot and outer ring slot to put in the hinge assembly.

According to one embodiment of the present invention, the outer ring has an outer ring coupler, and the inner ring has an inner ring coupler. The outer ring coupler and the inner ring coupler are matched up to couple the inner ring and the outer ring. The outer ring coupler and the inner ring coupler can be various types. For example, when the outer ring coupler is a groove, grooves, a recess, recesses or other similar structure, the inner ring coupler can be a protrusion, protrusions or other similar structure. Conversely, when the inner ring coupler is a groove, grooves, a recess, recesses or other similar structure, the outer ring coupler can be a protrusion, protrusion or other similar structure.

Moreover, the invention allows reducing the assembly difficulty and preventing the wear between the flexible printed circuit and the hinge assembly.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

Figure 1A:
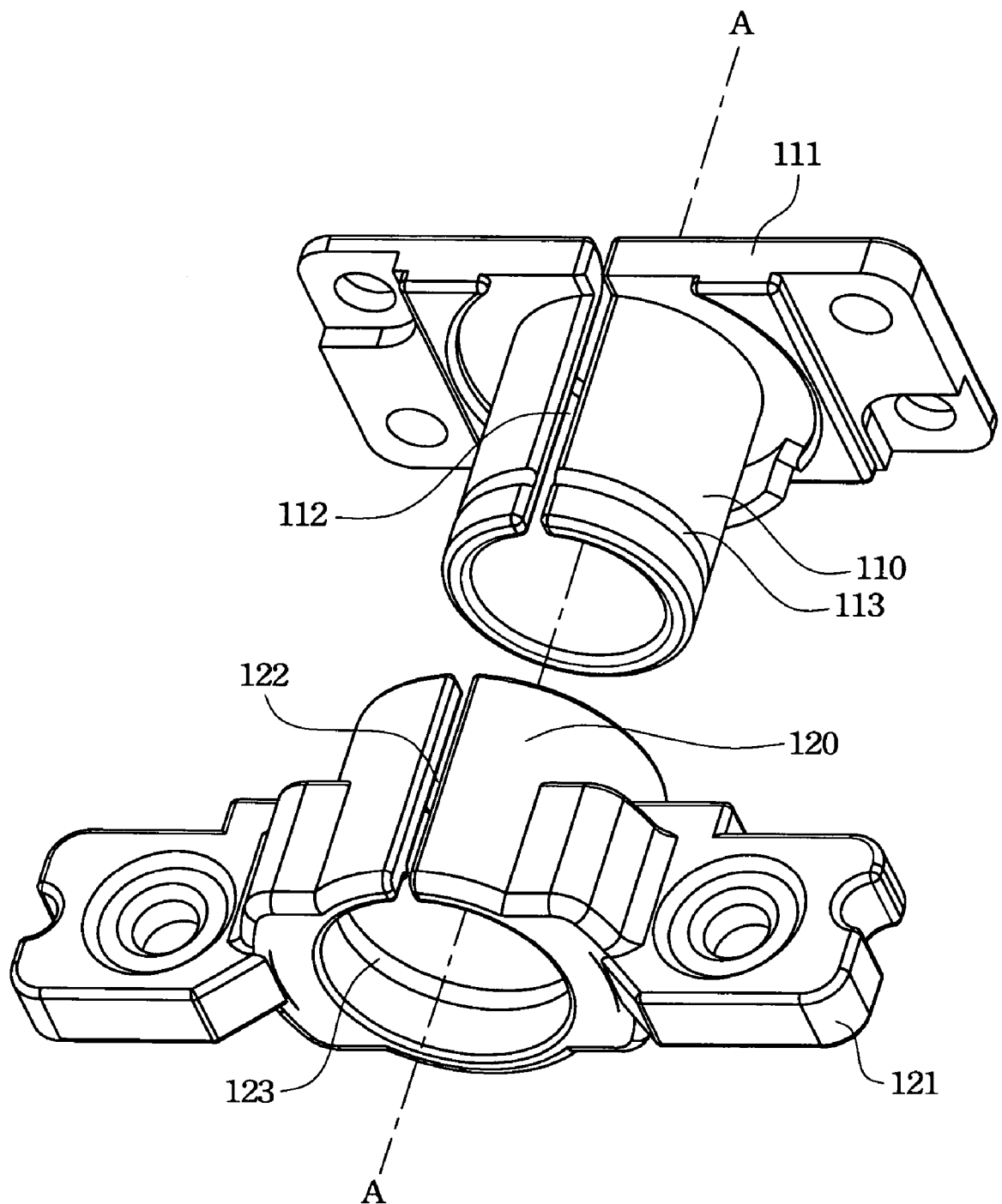
FIG. 1A is an exploded view according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Reference is made to FIG. 1A. A hinge assembly including an inner ring 110 and an outer ring 120 is provided.

The outer ring 120 has an outer ring slot 122 penetrating the sidewall of the outer ring 120 and connecting both ends of the outer ring 120 parallel with the axis A-A. Moreover, the outer ring 120 can include an outer ring flange 121 mounted on the bottom end of the outer ring 120 for connecting to an electrical device, such as a display screen or a base of a mobile phone. Furthermore, the outer ring flange 121 can have outer fasteners (not shown in FIG. 1A) mounted on the outer ring flange 121 for fastening the outer ring flange 121 to the electrical device. The outer fasteners can be bolts, rivets, glue and so on.

The inner ring 110 has an inner ring slot 112 penetrating the sidewall of the inner ring 110 and connecting both ends of the inner ring 110 parallel with the axis A-A. Similar to the outer ring, the inner ring 110 can include an inner ring flange 111 mounted on the upper end of the inner ring 110 for connecting to an electrical device, such as a display screen or a base of a mobile phone. Moreover, the inner ring flange 111 can have inner fasteners (not shown in FIG. 1A) mounted on the inner ring flange 111 for fastening the inner ring flange 111 to the electrical device. The inner fasteners can be bolts, rivets, glue and so on.

Figure 1B:
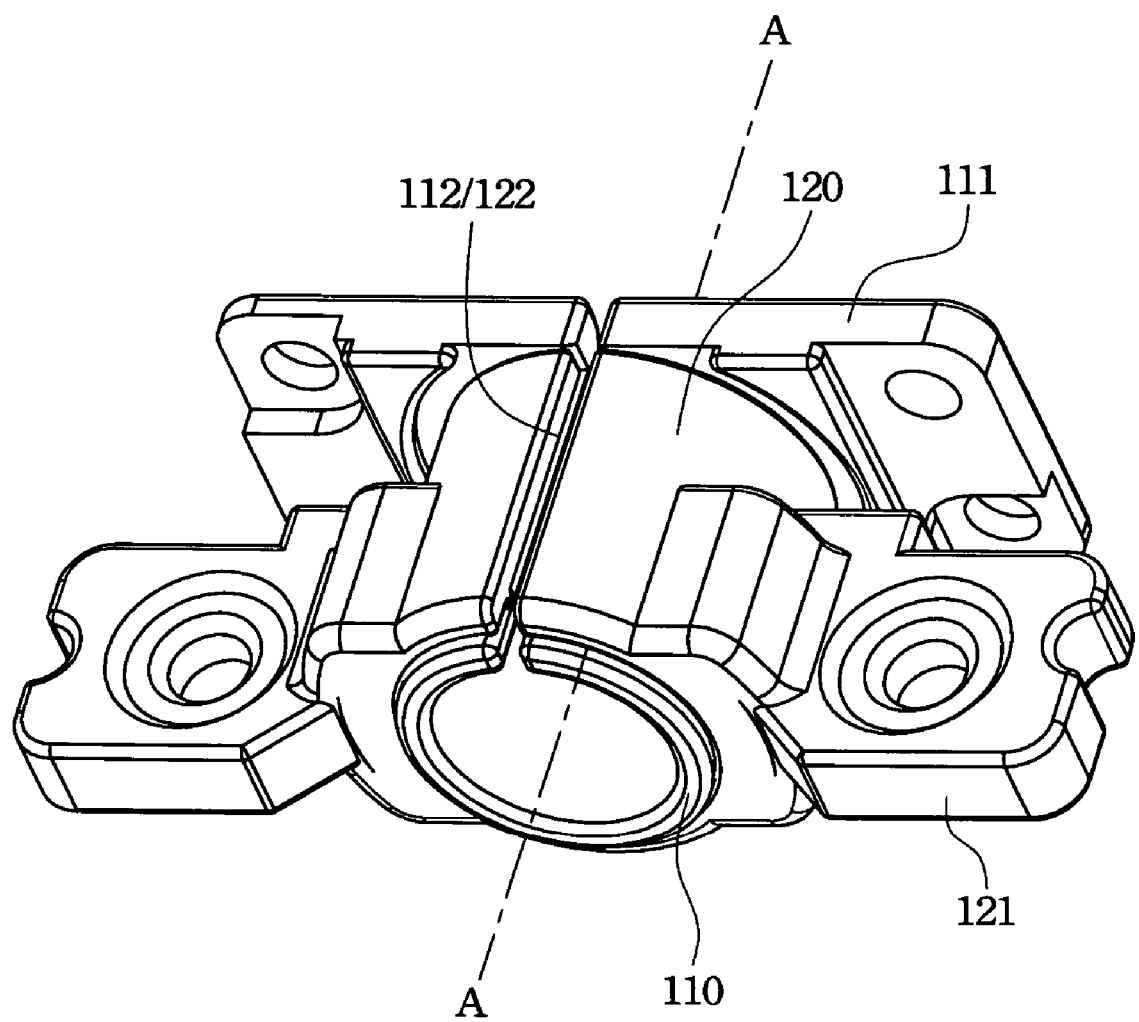
FIG. 1B is an assembled view according to one preferred embodiment of this invention.

Reference is made to FIG. 1B. The inner ring 110 is coaxially configured in the outer ring 120 and can be rotated relative to the outer ring 120 about the axis A-A. When the inner ring slot 112 and outer ring slot 122 are aligned, an electrical connecting device can pass through the inner ring slot 112 and outer ring slot 122 to insert into the hinge assembly.

The outer ring 120 has an outer ring coupler, and the inner ring 110 has an inner ring coupler. The outer ring coupler and the inner ring coupler are matched up to prevent the inner ring 110 and the outer ring 120 from separating. The outer ring coupler and the inner ring coupler can be various types. For example, when the outer ring coupler is a groove, grooves, a recess, recesses or other similar structure, the inner ring coupler can be a protrusion, protrusions, a ridge, ridges or other similar structure. Conversely, when the inner ring coupler is a groove, grooves, a recess, recesses or other similar structure, the outer ring coupler can be a protrusion, protrusions, a ridge, ridges or other similar structure.

Reference is again made to FIG. 1A. According to one preferred embodiment, the outer ring 120 has a ring-like protrusion 123 on the inside of the sidewall of the outer ring 120. The inner ring 110 has a ring-like groove 113 on the outside of the sidewall of the inner ring 110. The ring-like protrusion 123 is inserted in the ring-like groove 113 for preventing the inner ring 110 and the outer ring 120 from separating. In another embodiment, the ring-like groove can be mounted on the on the inside of the sidewall of the outer ring 120, and the ring-like protrusion can be mounted on the outside of the sidewall of the inner ring 110.

Figure 2A:
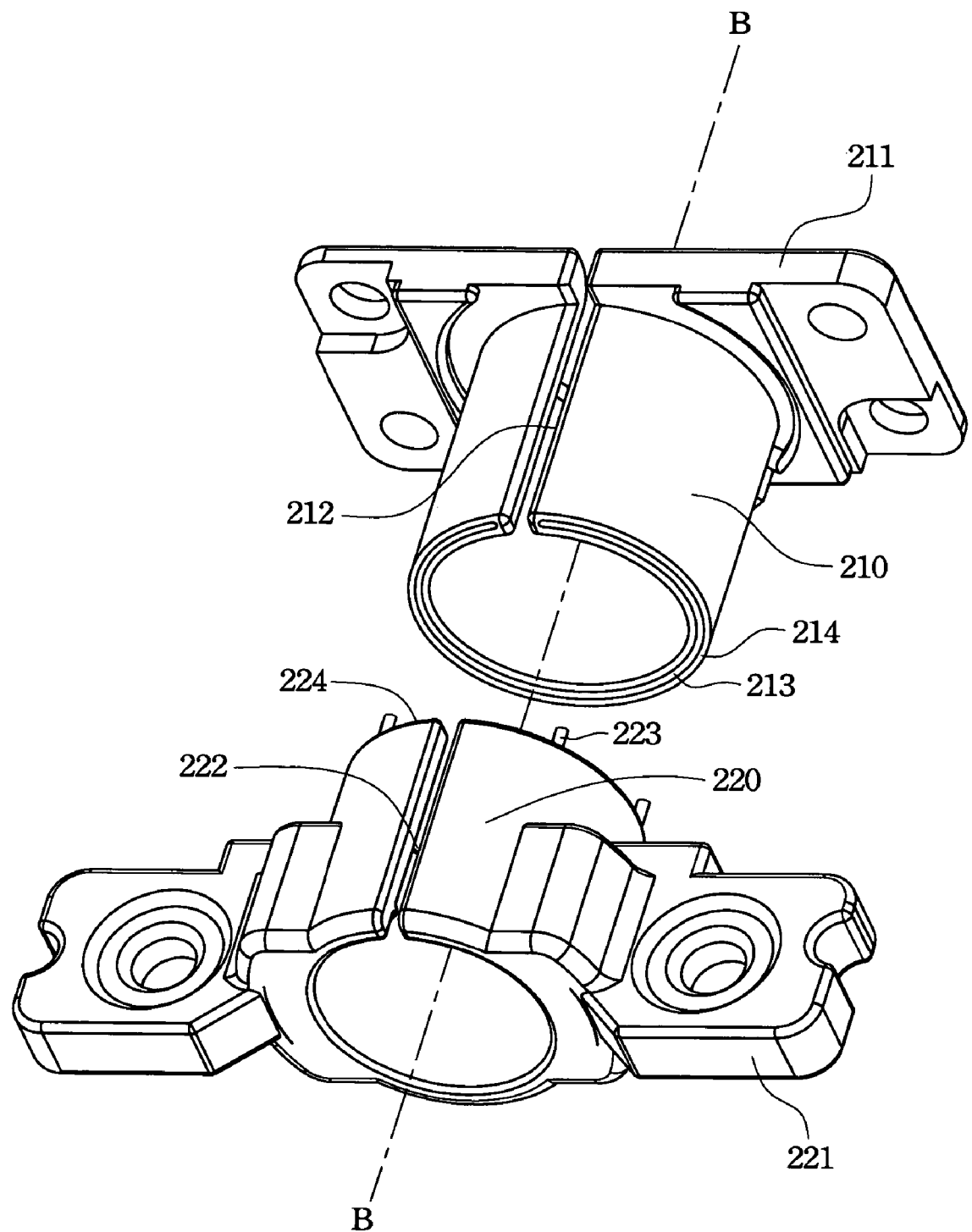
FIG. 2A is an exploded view according to another preferred embodiment of this invention.

According to still another preferred embodiment, the inner ring and the outer ring can be assembled another way. Reference is made to FIG. 2A. The outer ring 220 has a plurality of pins 223 mounted on the upper end 224 of the outer ring 220. The inner ring 210 has a ring-like groove 213 mounted on the bottom end 214 of the inner ring 210. The pins 223 and the ring-like groove 213 can be differently shaped. For example, the pins 223 can instead be a ring-like protrusion. Furthermore, the positions of the pins 223 or ring-like protrusion and the ring-like groove 213 can be interchangeable.

Figure 2B:
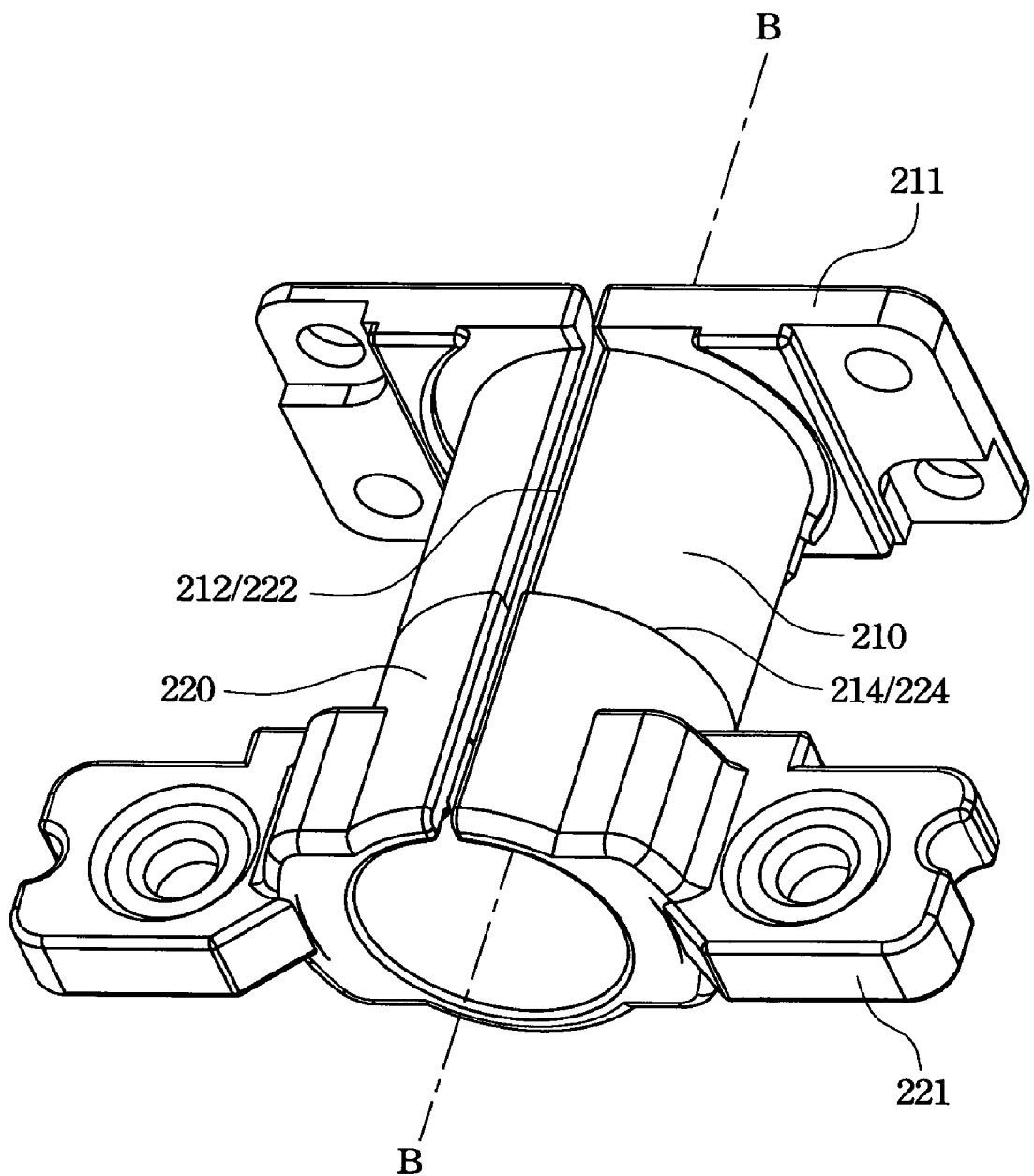
FIG. 2B is an assembled view according to another preferred embodiment of this invention.

Reference is made to FIG. 2B. The pins 223 are inserted in the ring-like groove 213 for coaxially connecting the inner ring 210 to the outer ring 220, wherein the bottom end 214 of the inner ring 210 is connected on the upper end 224 of the outer ring 220 to be rotated relative to the outer ring 220 about the axis B-B. When the inner ring slot 212 and outer ring slot 222 are aligned, an electrical connecting device can pass through the inner ring slot 212 and outer ring slot 222 to stay in the hinge assembly.

In conclusion, the present invention allows:

(1) eliminating the size limitation of the connectors configured on both ends of an electrical connecting device, such as a flexible printed circuit, that electrically connects two devices through a hinge assembly;

(2) reducing the assembly difficulty because the electrical connecting device can easily connect two devices which can rotate relative to each other; and (3) preventing wear between the electrical connecting device and the hinge assembly.

Although the present invention has been described in considerable detail with reference to certain preferred embodiments thereof, other various embodiments are possible. For example, the inner ring and the outer ring can be assembled in different ways. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge assembly for staying an electrical connecting device, comprising:

an outer ring having an outer ring slot penetrating the sidewall of the outer ring; and an inner ring having an inner ring slot penetrating the sidewall of the inner ring, wherein the bottom end of the inner ring is connected to the upper end of the outer ring to be rotated relative to the outer ring, and thus the electrical connecting device passes through the inner ring slot and the outer ring slot to put in the hinge assembly when the inner ring slot and the outer ring slot are aligned.

2. The hinge assembly of claim 1, wherein the outer ring has an outer ring coupler and the inner ring has an inner ring coupler, and the outer ring coupler and the inner ring coupler are matched up to prevent the inner ring from separating.

3. The hinge assembly of claim 1, wherein the outer ring has a ring-like groove mounted on the upper end of the outer ring, the inner ring has at least one pin mounted on bottom end of the inner ring, and the ring-like groove and the pin are matched up.

4. The hinge assembly of claim 1, wherein the inner ring has a ring-like groove mounted on the bottom end of the inner ring, the outer ring has at least one pin mounted on the upper end of the outer ring, and the ring-like groove and the pin are matched up.

5. A hinge assembly for staying an electrical connecting device, comprising:

an outer ring having an outer ring slot penetrating the sidewall of the outer ring and at least one protrusion mounted on the inside of the sidewall of the outer ring; and an inner ring having an inner ring slot penetrating the sidewall of the inner ring and a groove mounted on the outside of the sidewall of the inner ring, wherein the inner ring is coaxially configured in the outer ring, the groove and the protrusion are matched up, and thus the electrical connecting device passes through the inner ring slot and the outer ring slot to put in the hinge assembly when the inner ring slot and the outer ring slot are aligned.

* * * * *